United States Patent [19]

Nagy

[11] Patent Number: 5,736,225
[45] Date of Patent: Apr. 7, 1998

[54] HANDRAIL AND PROCESS FOR THE PREPARATION THEREOF

[75] Inventor: György Nagy, Bad Neuenahr, Germany

[73] Assignee: Böttcher Tech GmbH & Co., Grafschaft-Gelsdorf, Germany

[21] Appl. No.: 584,023

[22] Filed: Jan. 11, 1996

[30] Foreign Application Priority Data

Jan. 10, 1995 [DE] Germany .................. 195 00 300.4

[51] Int. Cl.$^6$ .............................. B32B 3/28; B65G 15/00
[52] U.S. Cl. ................... 428/167; 428/172; 428/192; 428/212; 156/60; 156/123; 156/228; 198/337; 198/338
[58] Field of Search .................... 428/167, 172, 428/192, 212, 138; 256/59, 65; 198/321, 335, 337, 338; 156/60, 123, 228, 242, 312

[56] References Cited

U.S. PATENT DOCUMENTS

| | | | |
|---|---|---|---|
| 1,580,075 | 4/1926 | Paine | 428/167 |
| 2,021,522 | 11/1935 | Schacht | 428/167 |
| 4,112,195 | 9/1978 | Pott et al. | 428/167 |
| 4,414,316 | 11/1983 | Conley | 428/167 |

FOREIGN PATENT DOCUMENTS

| | | |
|---|---|---|
| 208 292 | 3/1960 | Austria . |
| 389 689 | 1/1990 | Austria . |
| 1 811 982 | 7/1969 | Germany . |
| 1 920 385 | 11/1969 | Germany . |

*Primary Examiner*—Donald Loney
*Attorney, Agent, or Firm*—Jacobson, Price, Holman & Stern, PLLC

[57] ABSTRACT

A handrail with or without a wedge for escalators and speedwalks involves a number of permanently connected molded layers wherein the lower outer layer of the handrail, in part, constitutes a slide layer and, in part, constitutes a conveyor layer, an inner layer having increased longitudinal strength constitutes a traction carrier, and the upper outer layer constitutes an uppermost elastic coating of said handrail, wherein said lower outer layer has at least two symmetrically arranged longitudinal grooves whose spacing is somewhat larger than the width of said inner layer having increased longitudinal strength. The tractor carrier of the handrail is always accurately centered so that it does not tend to lateral movement.

16 Claims, No Drawings

HANDRAIL AND PROCESS FOR THE PREPARATION THEREOF

The object of the present invention is a handrail with or without a wedge for escalators and speedwalks consisting of a number of permanently connected molded layers wherein the lower outer layer of said handrail in part constitutes a slide layer and in part constitutes a conveyor layer, an inner layer having increased longitudinal strength constitutes the traction (tractor) carrier, and the upper outer layer constitutes the uppermost elastic coating of said handrail, as well as a process for the preparation thereof.

DE-A-39 21 888 describes a generic handrail with improved slide and conveyor characteristics and a process for the preparation thereof. However, the problem of centering the traction carrier layer has not been solved. No indication is given, either, as to how the transitions from one layer to another which are necessarily formed can be protected from external wear attacks.

U.S. Pat. No. 2,893,466 describes rubber conveyor belts with textile and steel cable inserts rather than handrails. The fabrics are pressed between the steel cables of the rough-state conveyor belt by means of appropriate devices. In doing so, equal spacing of the cables throughout the width of the belt is to be achieved. Since the device which presses the fabric sheets between the cables is no longer effective during vulcanization, it is still possible for the cables and fabric sheets to shift laterally in the course of vulcanization, all the more so since flow processes occur within the liquid rubber during vulcanization.

Escalators (moving staircases) and speedwalks (pedestrian conveyors) provide a comfortable and safe conveyance for people and are increasingly used especially in public buildings. Escalators and speed walks require handrails which have to meet increasing quality requirements. Thus, they must exhibit low longitudinal elongation and high longitudinal flexibility, but also high transverse rigidity. They must be readily conveyed by the driving means, but slide easily on guide members. Longitudinal flexibility together with low longitudinal elongation is generally achieved by incorporation of an inner layer having increased longitudinal strength which constitutes the tractor carrier. This layer generally consists of rubberized single cables with high strengths. These cables are preferably made of steel, but can also be prepared, if desired, from appropriate plastics, such as aramides, or carbon fibers. To date, handrails have mainly been formed into a C-shape, where the two ends are also called lips. The upper outer layer of the handrail constitutes the uppermost elastic coating and is generally made of rubber or elastomeric plastics. This layer may also be dyed if desired.

The lower outer layer of the handrail is made, in part, as a slide layer and, in part, as a conveyor layer. The conveyor layer can also be made into a wedge, which is conveyed through appropriate driving wheels with wedge-shaped notches. In most cases, however, it is sufficient if this layer is made flat and consists of a material which has sufficiently high frictional resistance to be conveyed by an appropriate driving wheel. The inner flanks of C-shaped handrails are generally lined with a slide layer in order that they can be passed over appropriate guide members with low friction and low wear. Therefore, this slide layer is preferably prepared from highly tear resistant plastics with low friction. However, these plastics must be readily bonded or welded to the material of the upper outer layer of the handrail.

In addition to the three layers mentioned, handrails often also contain layers of rubberized fabrics, threads or fibers which are positioned between the tractor carrier and the upper outer layer and/or the lower outer layer. These additional layers contribute to transverse rigidity. Moreover, they may also contribute to the increased longitudinal strength, although the main load is taken up by the tractor carrier, i.e., the inner layer having increased longitudinal strength.

One great problem in the preparation of such handrails is that the inner layer having increased longitudinal strength, in particular, which constitutes the tractor carrier, is shifted laterally. Although during the pressing process this layer is clamped and thus roughly centered, it can be observed time and again that this inner layer is shifted, with the result that the finished handrails will not run straight but tend to lateral movement. A similar problem arises in the application of the lower outer layer of the handrail, which is made in part as a slide layer and in part as a conveyor layer. In this case too, lateral displacing is very obtrusive and may result in early wear. Finally, the seam between two different materials constitutes a certain weak point, which may result in early wear.

Particularly obtrusive is the lateral displacement of both the tractor carrier and the different materials of the lower outer layer when the two ends of an open handrail segment are joined to form a closed ring. At this point, the steel cables are spliced together and only then is this portion overlapped in total and pressed together. Laterally displaced steel cord layers are very difficult to splice together and will result both in weak points and points with uneven lateral movement.

Therefore, the problem existed to remove these drawbacks and difficulties by taking care that, in particular, the inner layer having increased longitudinal strength, which constitutes the tractor carrier, is accurately centered when the layers are placed on one another and that in addition the different materials of the lower outer layer are accurately positioned. Finally, care had be taken that the seams of the different materials were well bonded together and would not result in early wear.

This problem can now be solved by providing the mold core of the press with at least two symmetrically arranged longitudinal guide ribs on its upper side, which may optionally be discontinuous, and whose spacing is somewhat larger than the width of the inner layer having increased longitudinal strength. Preferably, the mold core and/or the mold cavity have at least two additional longitudinal guide ribs in the region constituting the handrail lips.

The guide ribs on the upper side of the mold core of the press may optionally be discontinuous since it is sufficient to center and adjust the tractor carrier only at certain intervals. The additional guide ribs at the mold core and/or the mold cavity should be continuous because they serve to connect the different regions of the lower outer layer and to protect this joint.

The height of the guide ribs is generally from 0.5 to 5 mm. An optimum height has proven to be from 2 to 3 mm.

Due to these guide ribs, the handrail according to the invention has at least two symmetrically arranged longitudinal grooves at its lower outer layer whose spacing is somewhat larger than the width of the inner layer having increased longitudinal strength. This groove may also be discontinuous when the guide ribs are discontinuous. Due to the additional longitudinal guide ribs, the handrails have at least two additional longitudinal grooves, namely at the lips of the handrail. In the optionally discontinuous grooves the seam is, preferably, positioned, between the conveyor layer, in the middle, and the two lateral slide layers. It is particularly preferred that the seam between the slide layers and the upper elastic coating of the handrails be also positioned in such a groove.

The grooves at the bottom side of handrails as well as in the region of the lips, as such, result in a weakening of the handrail's stability. This weakening is irrelevant, however, since the handrail is subjected to practically no mechanical stress in these regions. Rather, according to the invention, the seams of different materials are accommodated in those grooves to protect these potential weak points from mechanical stress. These advantages also apply to handrails whose conveyor layer is made into a wedge. Such a wedge-shaped embodiment of the conveyor layer will result in an enhanced conveyance with increased loads. Therefore, this wedge-shaped embodiment is preferably contemplated for handrails subjected to increased loads.

The permanent connection of the different layers can be performed in a per se known manner by pressing in a heated press. This is necessary, in particular, in the case of rubber compositions that are vulcanized only under such conditions. In principle, however, materials other than rubber can also bond or weld together the layers, though the use of organic solvents should be avoided, if possible.

Thus, the handrails according to the invention do not tend to lateral movement. They are readily centered at driving and deflection wheels and avoid wear of the lips at the edge zones of the wheel bodies. Also, due to the fact that the seams between different materials are accommodated in the grooves, they do not come into direct contact with the driving and deflection wheels and, hence, are significantly less subjected to mechanical stresses. When the two ends of an open handrail are joined to form a closed ring, it is possible without difficulty to splice the steel cables together to give a stable and well centered joint. Thus, it is possible without difficulty to meet the required tear resistances of 25,000 Newtons.

What is claimed is:

1. A handrail for escalators and speedwalks including:
   a) a lower outer layer comprising a conveyor part in the middle of the outer layer and two lateral slide parts;
   b) an upper outer layer comprising an elastic coating of the handrail; and
   c) an inner layer comprising a traction carrier having a width, positioned between said upper and lower outer layers;

characterized in that said handrail has a bottom side and a longitudinal axis, and the lower outer layer contains two longitudinal grooves, which are located at the bottom side of said handrail and are symmetrically disposed relative to the longitudinal axis, the spacing between said grooves being greater than the width of said inner layer.

2. The handrail of claim 1 having a C-shape, each opposing end of which comprises a lip of said handrail, and each lip contains a longitudinal groove.

3. The handrail of claim 1 wherein said conveyor part is wedge shaped and disposed between said longitudinal grooves.

4. The handrail of claim 1 wherein said slide parts are disposed laterally of said grooves.

5. The handrail of claim 4 having a C-shape, each opposing end of which comprises a lip of said handrail, each lip contains a longitudinal groove, and each slide part extends laterally to the longitudinal groove in the lip.

6. The handrail of claim 1 wherein said grooves are positioned at seams between said conveyor part and said two slide parts.

7. The handrail of claim 6 having a C-shape, each opposing end of which comprises a lip of said handrail, and each lip contains a longitudinal groove located at a seam between the upper and lower outer layers.

8. The handrail of claim 1 wherein the longitudinal grooves are discontinuous.

9. A process for the preparation of a handrail according to claim 1 comprising the steps of:
   a) placing on top of one another in a press a plurality of layers comprising said lower outer layer, said inner layer, and said upper outer layer; and
   b) permanently connecting together in said press said plurality of layers;

characterized in that said press contains a mold core having on its upper side at least two symmetrically arranged longitudinal guide ribs having a spacing therebetween larger than the width of said inner layer.

10. The process of claim 9 characterized in that the guide ribs have a height of 0.5 to 5 mm.

11. The process of claim 9 characterized in that the guide ribs are discontinuous.

12. The process of claim 11 characterized in that the guide ribs have a height of 0.5 to 5 mm.

13. A process for the preparation of a handrail according to claim 2 comprising the steps of:
   a) placing on top of one another in a press a plurality of layers comprising said lower outer layer, said inner layer, and said upper outer layer; and
   b) permanently connecting together in said press said plurality of layers;

characterized in that said press contains a mold core having on its upper side at least two symmetrically arranged longitudinal guide ribs having a spacing therebetween larger than the width of said inner layer.

14. The process of claim 13 characterized in that the guide ribs have a height of 0.5 to 5 mm.

15. The process of claim 14 characterized in that the guide ribs are discontinuous.

16. The process of claim 15 characterized in that the guide ribs have a height of 0.5 to 5 mm.

* * * * *